2,997,745
PROCESS FOR PRODUCING ABRASION-RESISTANT PLASTIC ARTICLES
Edwin H. Kroeker, Ivyland, Pa., assignor to Rohm & Haas Company, Philadelphia, Pa., a corporation of Delaware
No Drawing. Filed Jan. 14, 1958, Ser. No. 708,771
8 Claims. (Cl. 18—55)

The present invention is concerned with an improved process for producing hard abrasion-resistant surfaces on plastic articles, especially on articles formed of acrylic esters such as poly(methyl methacrylate).

It is already known to apply coatings of partially polymerized polyethylenically unsaturated monomers such as a glycol dimethacrylate to the surface of formed plastic articles and subsequently to convert such coating to the insoluble and infusible state. This procedure has the disadvantage resulting from the fact that the surface tension of the coating materials frequently gives rise to irregularities in thickness because of the tendency of the coating to draw up into a plurality of droplets on the surface of the coated article. Consequently, the finished product has undesirable irregularities in the surface. The addition of spreaders or thickeners cannot completely remove such irregularities. It is an object of the present invention to provide an improved process for the production of plastic articles having hard abrasion-resistant surfaces which overcome the aforementioned disadvantage and have smooth surfaces free of irregularities.

The general procedure of the present invention is represented by the following flow-sheet or flow-diagram:

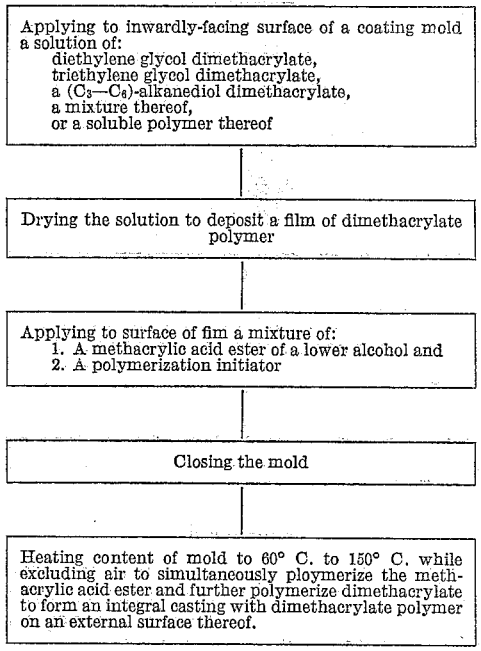

In accordance with the present invention, a solution of one or more of certain dimethacrylates or of a soluble polymer thereof having a low molecular weight short of the insoluble or gel stage, is applied to a molding member or into a mold having the proper contour for forming a plastic article or is applied to the surface of a member, such as a glass plate, which serves as one component of a casting mold. The solution is polymerized and dried to a solid film and then there is superimposed upon the dried polymeric material a polymerizable liquid for producing the main body of the shaped article. The mold is closed by the application of a molding member or closure and the content of the mold is subjected to polymerization conditions.

In one preferred embodiment of the present invention, a polyethylenically unsaturated monomer is partially polymerized in bulk or in a solvent to a thickened but still ungelled condition, and this partially polymerized product, dissolved either in the solvent or in a residual portion of unpolymerized monomer, is poured upon or into a molding member which may simply be a glass plate or polished metal plate which may be provided with a dam or wall extending along the periphery thereof and above one face of the plate. After this polymer is dried to form a film covering the plate and, if desired, the inside walls of the dam, the polymerizable material which forms the main body of the article is introduced with suitable catalysts. Then a closure, such as a glass plate, is laid upon the dam enclosing the two polymerizable layers between the molding members, such as the plates. As the final closure or plate is applied, it should be applied in such a way as to force any air bubbles out over one edge of the dam. This is facilitated by introducing excess of the polymerizable liquid so as to bring the height thereof above that of the dam. Thereafter the mold assembly may be clamped and subjected to heat to effect the polymerization. Temperatures of about 60° to 150° C. may be employed depending upon the particular polymerizable materials used. The conditions, mold construction, and procedures described in United States Patent 2,154,639 may be employed and are incorporated herein by reference.

The polyethylenically unsaturated material used to form the hard-abrasion-resistant surface is selected from the group consisting of dimethacrylates of an alkanediol having 3 to 6 carbon atoms, diethylene glycol dimethacrylate, triethylene glycol dimethacrylate, and mixtures thereof. Thus, the dimethacrylates of 1,2-dihydroxypropane, 1,3-dihydroxypropane, 1,4-dihydroxybutane, 1,5-dihydroxypentane, and 1,6-dihydroxyhexane are suitable. The preferred products are the homopolymers of a dimethacrylate of a glycol having 4 to 6 carbon atoms between the two hydroxy groups.

These polyethylenically unsaturated monomers are partially polymerized to a still fusible condition either by the simple use of heat with or without light, such as ultraviolet light, preferably in the presence of about 0.5% to 5% by weight, based on the weight of the monomer, of such initiators or catalysts as free-radical catalysts including the organic peroxides of which acetyl peroxide, benzoyl peroxide, and lauroyl peroxide are representative, or azo catalysts such as diethyl diazodiisobutyrate and α,α'-diazodiisobutyronitrile. Temperatures between 60° and 150° C. may be employed. The partial polymerization is effected in an inert atmosphere, by which is meant an oxygen-free atmosphere, such as of nitrogen, helium, or carbon dioxide. The partial polymerization may be effected before or after application to the surface of the molding member. The reaction may be stopped short of gelation by the use of inhibitors or by cooling to normal room temperature. Thereafter, the partially polymerized dimethacrylate may be dried on the molding member, such as by heating to temperatures of 60° to 100° C., and such drying may be accompanied by polymerization.

The main body of the plastic article may be formed by the polymerization of such monomers as methyl methacrylate, ethyl methacrylate, and other methacrylic acid esters of alcohols, especially lower alcohols having 1 to 4 carbon atoms. These ester monomers are introduced into the mold on top of the layer of partially polymerized polyethylenically unsaturated material, the amount of the patrially polymerized material being such as to provide a very thin integral external component of the final molded product. Any of the free-radical initiators mentioned hereinabove may be incorporated in small amounts from about 0.5% to 3% on the weight of the acrylic ester monomer.

On completion of polymerization, the parts of the mold are separated and the cast or molded article is removed. Because the mold itself prevents the introduction of air and because air bubbles are removed either by deaeration of the polymerizable materials introduced into the mold or by care in eliminating bubbles during assembly of the mold, or both, the difficulties associated previously with the formation of abrasion-resistant surfaces on formed articles, as of methyl methacrylate polymers, are entirely avoided. In addition, the mold assures the production of the desired shape of surface on both faces of the hard-surfaced product. Any irregularity in the thickness of the film of dimethacrylate polymer faces inwardly and cannot alter the surface of the casting since such surface is controlled by the contour of the surface of the first molding member upon which the film is first deposited. The introduction of the catalyzed methyl methacrylate or other casting monomer in liquid form results in the filling of any irregularities in thickness of the dimethacrylate polymer film in a manner which avoids introduction of air bubbles or voids and provides an integral cast product which, to normal visual observation, appears to be completely uniform throughout.

The thickness of the surfacing material may be from about 0.001 inch to 0.05 inch as desired. The thinner the film of infusible cross-linked polymer formed on the plastic article, the less opportunity there is for the surface of the article to be changed in optical characteristics. The thinnest surfacings, of course, have the greatest transparency.

In the following examples which are illustrative of the present invention, the parts and percentages are by weight unless otherwise specifically stated. Resistance to abrasion was determined by the standard test using a falling abrasive and designated ASTM D673–44.

*Example 1*

(a) A mixture of 90 parts of 1,5-pentamethylene glycol dimethacrylate monomer, 10 parts of methyl methacrylate polymer (to thicken and assist spreading) dissolved in 100 parts of toluene and containing 1 part of benzoyl peroxide were blended to form a homogeneous solution. Portions of this solution were brushed upon a sheet of plate glass and placed in an inert atmosphere (nitrogen) in an oven and heated for one-half hour at 100° C. The dried film was hard and clear. Using the sheet of plate glass with dried film as one side of a mold with the film on the inside face and another sheet of clean plate glass as the other side of a mold as in United States Patent 2,154,639, a cast sheet of methyl methacrylate was prepared by pouring a mixture of 100 parts of methyl methacrylate and 0.8 part of benzoyl peroxide into the space within a rubber dam between the sheets and heating the mold assembly at 90° C. for 15 minutes and then 25 hours at 75° C. Upon separating the mold, all of the film had become firmly and integrally attached to the poly(methyl methacrylate) sheet and the surface was now smooth and flat, conforming to the shape of the original plate glass. Upon subjecting both sides of the sheet to the falling abrasive test, it was found that the treated side was five to eight times as abrasion-resistant as the untreated side.

(b) When the dimethacrylate of 2-ethylhexanediol-1,3 was substituted for 1,5-pentane dimethacrylate in part (a), the resulting sheet showed only slightly improved abrasion resistance.

*Example 2*

A mixture of 95 parts of 1,5-pentamethylene glycol dimethacrylate monomer, 5 parts of poly(β-vinyloxyethyl methacrylate) (to thicken and assist spreading), 1 part of benzoyl peroxide, and 100 parts of toluene was similarly applied to a plate glass, and heated in an inert atmosphere for one-half hour at 100° C. Again, using one such plate as one of the faces of a plate glass mold, a methyl methacrylate sheet was cast as in Example 1(a). Upon separation both sides of the cast sheet were smooth and flat. Abrasion tests on both sides showed that the treated side was five to ten times as abrasion-resistant as the untreated side.

*Example 3*

When 1,2-propanediol dimethacrylate was substituted for 1,5-pentanediol dimethacrylate in Example 2, the treated sides of the resulting sheets were four to ten times as abrasion-resistant as the untreated sides.

*Example 4*

A mixture of 100 parts of 1,4-butanediol dimethacrylate monomer, 2 parts of benzoyl peroxide, and 300 parts of toluene was warmed with stirring in an inert atmosphere at 65° C. for one-fourth hour when thickening of the liquid was observed. The mass was immediately cooled to below 10° C. in an ice bath. The thickened, partially polymerized, product was brushed on a sheet of plate glass and heated thereon in an inert atmosphere for 16 hours at 100° C. The resulting films were hard and clear. Cast sheets of poly(methyl methacrylate) prepared using these films as one side of the mold showed abrasion-resistance on the treated side ten times that of the untreated side.

*Example 5*

When 1,2-propanediol dimethacrylate was substituted for the 1,4-butanediol dimethacrylate in Example 4, sheets having, on their treated sides, three to five times the abrasion-resistance of the untreated side were obtained.

*Example 6*

When 1,5-pentanediol dimethacrylate monomer was substituted for 1,4-butanediol dimethacrylate in Example 4, the thickened monomer obtained is applied to glass and the resulting films were hard and clear. Sheets of methyl methacrylate cast on these films showed abrasion resistance, on the treated side, about five to ten times that of the untreated side.

*Example 7*

A mixture of 20 parts of diethyleneglycol dimethacrylate monomer, 1 part of benzoyl peroxide, and 80 parts of toluene were warmed at 65° C. with stirring. After 5 minutes the mixture became slightly cloudy. The mixture was cooled rapidly and brushed on a sheet of plate glass and baked one hour in an inert atmosphere (nitrogen) at 100° C. The resulting film was hard and clear. Cast polymerized methyl methacrylate sheets obtained by using the coated glass plate as one side of the casting mold were 5 to 10 times as abrasion-resistant on the treated side as on the untreated side.

*Example 8*

(a) When triethyleneglycol dimethacrylate was substituted in Example 7, cast polymerized methyl methacrylate sheets were five to ten times as abrasion-resistant on the treated side as the untreated side.

(b) Similar results were obtained when a dimethacrylate of a mixture of diethylene and triethylene glycols in about equal parts by weight was used.

I claim:

1. A process comprising applying a solution of a compound selected from the group consisting of diethylene glycol dimethacrylate, triethylene glycol dimethacrylate, and dimethacrylates of alkanediols having 3 to 6 carbon atoms, a mixture of at least two of these dimethacrylates, and a soluble polymer of molecules consisting of at least one of these dimethacrylates to the inwardly-facing surface of a member of a casting mold, drying the solution to deposit a film of a polymer of at least one of the aforesaid dimethacrylates, then applying in contact with the surface of the film of the polymer a mixture of a methacrylic acid ester of a lower alcohol and a polymerization initiator, closing the mold, and heating the content of the mold to a temperature of 60° C. to 150° C. while maintaining the mold closed to exclude air therefrom to simultaneously effect polymerization of the methacrylic acid ester and further polymerization of the dimethacrylate in contact therewith to form an integral casting therefrom with the dimethacrylate polymer on an external surface of the casting.

2. A process comprising applying to the inside wall of a casting mold member a solution of a compound selected from the group consisting of diethylene glycol dimethacrylate, triethylene glycol dimethacrylate, and dimethacrylates of alkane diols having 3 to 6 carbon atoms, a mixture of at least two of these dimethacrylates, and a soluble polymer of molecules consisting of at least one of these dimethacrylates, drying the solution to deposit on the wall of the mold a film of a polymer of at least one of the aforesaid dimethacrylates, introducing a mixture of methyl methacrylate and a polymerization initiator therefor over and in contact with the polymeric dimethacrylate, closing the mold to exclude air from the methacrylates therein, and heating the contents of the mold to a temperature of 60° C. to 150° C. to simultaneously polymerize the methyl methacrylate and the dimethacrylate to form an integral molded body of poly (methyl methacrylate) having a hard, abrasion-resistant surface formed thereon of a cross-linked infusible polymer of the dimethacrylate.

3. A process as defined in claim 2 in which the compound is triethylene glycol dimethacrylate.

4. A process as defined in claim 2 in which the compound is diethylene glycol dimethacrylate.

5. A process as defined in claim 2 in which the compound is the dimethacrylate of 1,4-dihydroxybutane.

6. A process as defined in claim 2 in which the compound is the dimethacrylate of 1,5-dihydroxypentane.

7. A process as defined in claim 2 in which the compound is the dimethacrylate of 1,2-propanediol.

8. A process as defined in claim 2 in which the dimethacrylate is a mixture of the dimethacrylates of diethylene glycol and triethylene glycol.

References Cited in the file of this patent

UNITED STATES PATENTS

| | | |
|---|---|---|
| 1,094,828 | Aylsworth | Apr. 28, 1914 |
| 2,320,533 | Muskat et al. | June 1, 1943 |
| 2,322,310 | Muskat et al. | June 22, 1943 |
| 2,454,910 | Carr | Nov. 30, 1948 |
| 2,781,553 | Varela et al. | Feb. 19, 1957 |